United States Patent
Wei et al.

(10) Patent No.: US 11,012,616 B2
(45) Date of Patent: May 18, 2021

(54) IMAGE PROCESSING SYSTEM FOR AUGMENTED REALITY AND METHOD THEREOF

(71) Applicants: LITE-ON ELECTRONICS (GUANGZHOU) LIMITED, Guangzhou (CN); LITE-ON TECHNOLOGY CORPORATION, Taipei (CN)

(72) Inventors: Shou-Te Wei, Taipei (CN); Wei-Chih Chen, Taipei (CN)

(73) Assignees: LITE-ON ELECTRONICS (GUANGZHOU) LIMITED; LITE-ON TECHNOLOGY CORPORATION

( * ) Notice: Subject to any disclaimer, the term of this patent is extended or adjusted under 35 U.S.C. 154(b) by 23 days.

(21) Appl. No.: 16/298,375

(22) Filed: Mar. 11, 2019

(65) Prior Publication Data
US 2019/0379825 A1    Dec. 12, 2019

(30) Foreign Application Priority Data
Jun. 12, 2018  (CN) .......................... 201810603887.1

(51) Int. Cl.
*H04N 5/232*    (2006.01)
*G06T 7/50*    (2017.01)
(Continued)

(52) U.S. Cl.
CPC .......... *H04N 5/23229* (2013.01); *G06T 7/50* (2017.01); *G06T 7/74* (2017.01); *G06T 7/77* (2017.01);
(Continued)

(58) Field of Classification Search
CPC ......... G06T 19/006; G06T 2207/10028; G06T 2219/2004; G06T 2219/2016; G06T 7/50;
(Continued)

(56) References Cited

U.S. PATENT DOCUMENTS

2017/0358142 A1* 12/2017 Lee ........................ H04W 4/029

FOREIGN PATENT DOCUMENTS

| CN | 106937531 A | 7/2017 |
| TW | I505709 B | 10/2015 |

OTHER PUBLICATIONS

Huang, Albert S., et al. "Visual odometry and mapping for autonomous flight using an RGB-D camera." Robotics Research. Springer, Cham, 2017. 235-252. (Year: 2017).*
(Continued)

*Primary Examiner* — Nirav G Patel
(74) *Attorney, Agent, or Firm* — Innovation Counsel LLP

(57) ABSTRACT

An image processing system including a camera, a positioning device, a processor and a display is provided. The camera captures a real view image. The positioning device detects a camera position of the camera. The processor receives a high-precision map and a virtual object, calculates a camera posture of the camera according to the camera position by using a simultaneous localization and mapping (SLAM), projects a depth image according to the camera posture and a three-dimensional information of the high-precision map, superimposes the depth image and the real view image to generate a stack image, and superimposes the virtual object to the stack image according to a virtual coordinate of the virtual object to produce a rendered image. The display displays the rendered image.

16 Claims, 4 Drawing Sheets

(51) Int. Cl.
*G06T 7/90* (2017.01)
*G06T 7/73* (2017.01)
*G06T 7/77* (2017.01)

(52) U.S. Cl.
CPC ...... *G06T 7/90* (2017.01); *G06T 2207/10028* (2013.01)

(58) Field of Classification Search
CPC .... G06T 7/74; G06T 7/77; G06T 7/90; H04N 5/23229
See application file for complete search history.

(56) References Cited

OTHER PUBLICATIONS

Liu, Ruyu, et al. "Towards SLAM-based outdoor localization using poor GPS and 2.5 D building models." 2019 IEEE International Symposium on Mixed and Augmented Reality (ISMAR). IEEE, 2019. (Year: 2019).*

* cited by examiner

IMAGE PROCESSING SYSTEM FOR AUGMENTED REALITY AND METHOD THEREOF

This application claims the benefit of People's Republic of China application Serial No. 201810603887.1, filed Jun. 12, 2018, the subject matter of which is incorporated herein by reference.

BACKGROUND OF THE INVENTION

Field of the Invention

The invention relates in general to an image processing system and the image processing method, and more particularly to an image processing system used in augmented reality and an image processing method.

Description of the Related Art

Generally speaking, the augmented reality technology requires the use of a camera capable of capturing the depth image for obtaining real distance between an object and the camera, and then determines the position of the virtual object in the frame according to the depth image. However, an ordinary depth camera can only obtain the depth of the environment within a distance of 2-3 meters to the camera. When the user intends to render a large virtual object to a large outdoor object (for example, the user intends to render a virtual octopus to the real scene of a high building and further displays the frame on a display), the position of the object rendered on the frame will be inappropriate (due to erroneous shielding effect) due to the depth camera cannot obtain correct depth of the large outdoor object.

Therefore, it has become a prominent task for the industries to precisely combine a virtual image and the image of a large object in the augmented reality.

SUMMARY OF THE INVENTION

According to one embodiment the present invention, an image processing system including a camera, a positioning device, a processor and a display is provided. The camera captures a real view image. The positioning device detects a camera position of the camera. The processor is coupled to the camera and the positioning device, calculating a camera posture of the camera according to the camera position by using a simultaneous localization and mapping (SLAM) algorithm, projecting a depth image according to the camera posture and a three-dimensional information of a high-precision map, superimposing the depth image and the real view image to generate a stack image, and superimposing a virtual object to the stack image according to a virtual coordinate of the virtual object to produce a rendered image. The display is coupled to the processor for displaying the rendered image.

According to another embodiment the present invention, an image processing method is provided. The image processing method includes following steps: capturing a real view image by a camera; detecting a camera position of the camera by a positioning device; calculating a camera posture of the camera according to the camera position by using a SLAM algorithm; projecting a depth image by the processor according to the camera posture and a three-dimensional information of the high-precision map; superimposing the depth image and the real view image by the processor to generate a stack image; superimposing the virtual object to the stack image by the processor according to a virtual coordinate of a virtual object to produce a rendered image; and displaying the rendered image by a display.

To summarize, according to the image processing system and the image processing method of the invention, a depth image is projected by transforming a real view image according to the information, such as the high-precision map and the camera posture. Then, the depth image and the real view image are precisely superimposed to generate a stack image. Since each point includes the depth information, the virtual object can be rendered to the stack image according to the corresponding virtual coordinate of the virtual object in the stack image, and the virtual object and large object of the real view image can be precisely combined.

The above and other aspects of the invention will become better understood with regard to the following detailed description of the preferred but non-limiting embodiment(s). The following description is made with reference to the accompanying drawings.

DETAILED DESCRIPTION OF THE INVENTION

Figure 1:
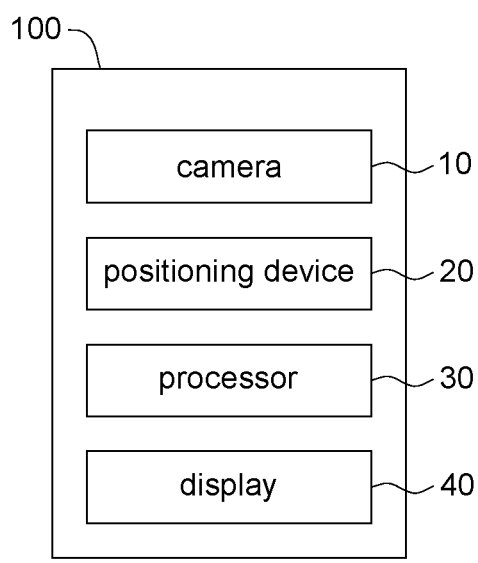
FIG. 1 is a block diagram of an image processing system according to an embodiment of the invention.
Figure 2:
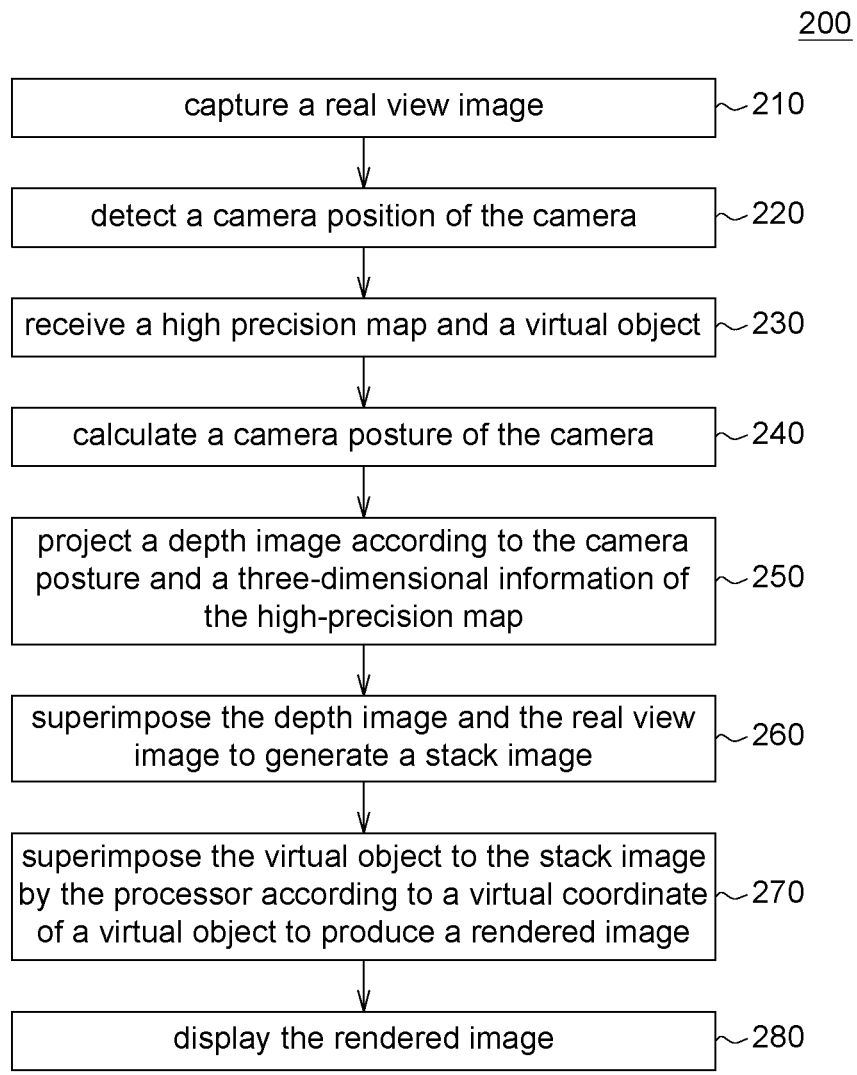
FIG. 2 is a flowchart of an image processing method according to an embodiment of the invention.

Refer to FIGS. 1-2. FIG. 1 is a block diagram of an image processing system 100 according to an embodiment of the invention. FIG. 2 is a flowchart of an image processing method 200 according to an embodiment of the invention. In an embodiment, the image processing system 100 includes a camera 10, a positioning device 20, a processor 30 and a display 40. The processor 30 is coupled to the camera 10 and the positioning device 20. The display 40 is coupled to the processor 30.

In an embodiment, the camera 10 can be implemented by a charge coupled device (CCD) or a complementary metal-oxide semiconductor (CMOS). The positioning device 20 can be implemented by a global positioning system (GPS) positioner. The processor 30 can be implemented by a microcontroller, a microprocessor, a digital signal processor, an application specific integrated circuit (ASIC) or a logic circuit.

In an embodiment, the display 40 can be the display device of a hand-held electronic device (such as a mobile phone or a PC tablet) or the display device of a head-mounted device.

Refer to FIGS. 2 and 3A-3D. FIG. 3A-3D are schematic diagrams of an image processing method according to an embodiment of the invention. Detailed description of the image processing method 200 of the invention is disclosed below. The elements mentioned in the image processing method 200 can be realized by the elements disclosed in FIG. 1.

In step 210, a real view image (such as FIG. 3C) is captured by the camera 10.

In step 220, a camera position of the camera 10 is detected by the positioning device 20. In an embodiment, the positioning device 20 of the image processing system 100 is a GPS positioner capable of detecting a camera position of the camera 10.

In step230, a high-precision map and a virtual object are received by the processor 30.

Figure 3A:
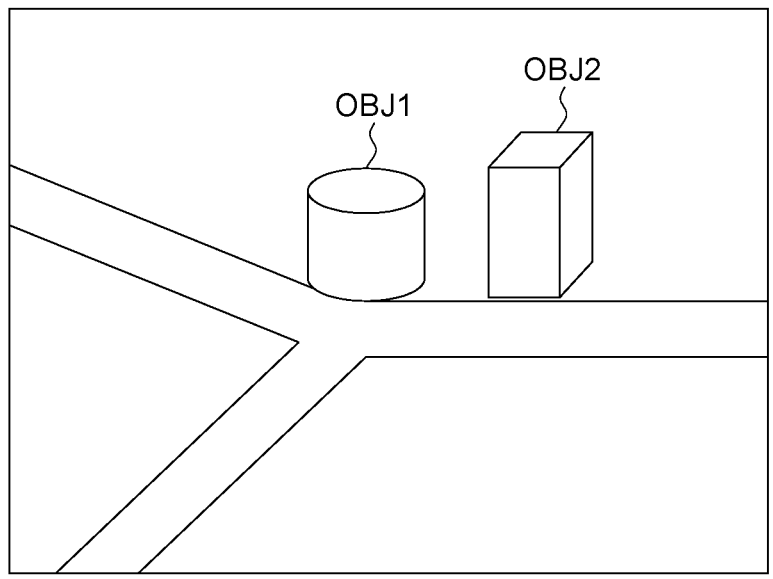
FIGS. 3A-3D are schematic diagrams of an image processing method according to an embodiment of the invention.

In an embodiment, the high-precision map can be prepared in advance. For example, the processor 30 can access the high-precision map stored in a remote storage device via a network or access the high-precision map from a storage device of the image processing system 100. In an embodiment, the high-precision map includes a three-dimensional information. As indicated in FIG. 3A, the three-dimensional information includes a three-dimensional composition of the real view image or a height information of an object (such as building OBJ1 or OBJ2) in the real view image.

Figure 3B:
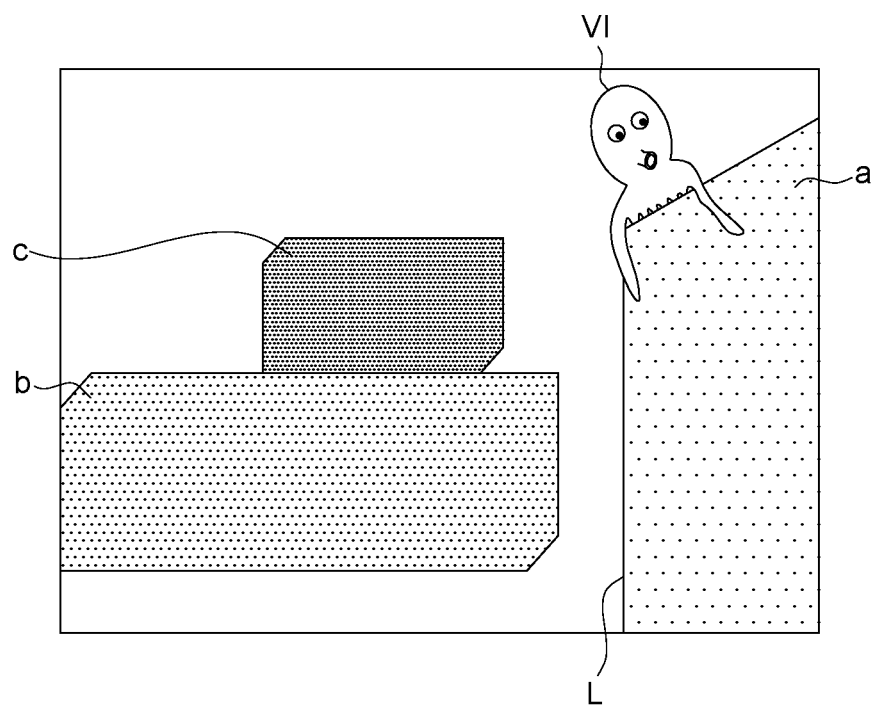
Figure 3C:
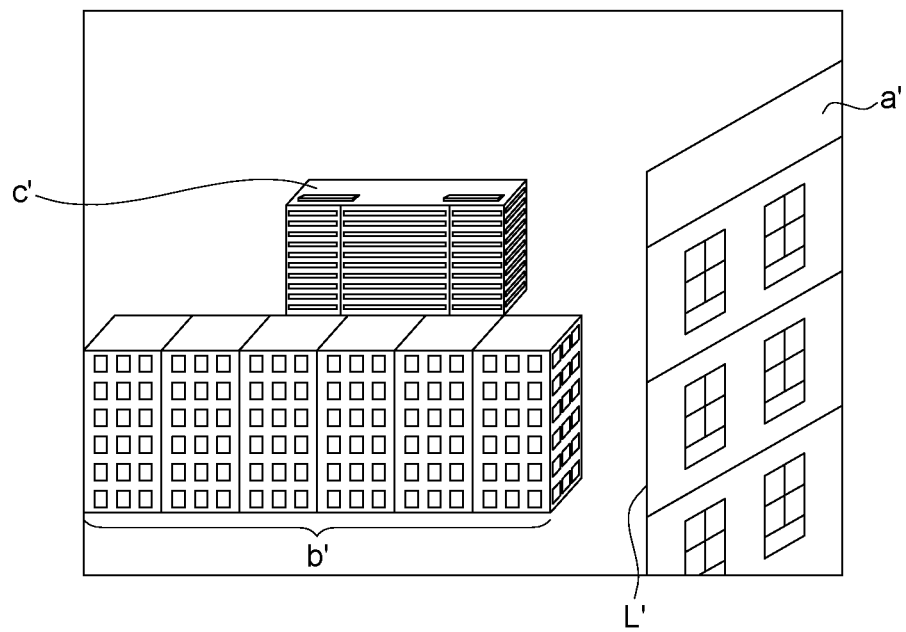

In an embodiment, the virtual object can be a three-dimensional virtual object prepared in advance. The virtual coordinate of each point of the virtual object can be defined. For example, the virtual object indicated in FIG. 3B is an octopus VI. With the processor 30, the user can draft the octopus VI and define the virtual coordinate of each point in the image of the octopus VI.

In step240, a camera posture of the camera 10 is calculated by the processor 30.

In an embodiment, the processor 30 calculates a camera posture of the camera 10 according to the camera position by using a simultaneous localization and mapping (SLAM) algorithm. In an embodiment, after the camera 10 captures multiple continuous images from different angles of the scene, corresponding positions of the feature points of the objects common to the images are obtained through comparison by using the SLAM algorithm, a three-dimensional map of the scene can be generated by superimposing corresponding positions of the feature points of the objects in different images, and a placement position of the camera 10 can be positioned. Thus, the camera posture (such as horizontal, inclined or vertical placement) and/or the capture angle (such as relative position between the camera 10 and a building) of the camera 10 can be obtained from the feature points.

In step250, a depth image is projected by the processor 30 according to the camera posture and a three-dimensional information of the high-precision map.

In an embodiment, the coordinate of each point in the high-precision map is mapped to a camera coordinate by the processor 30 using a coordinate transformation function, such that the image can be projected on the display 40.

For example, the processor 30 maps a three-dimensional information of the high-precision map, such as a world coordinate (designated as we in the coordinate transformation function) to a camera coordinate (designated as cc in the coordinate transformation function) by using a coordinate transformation function expressed as:

$$[xyz]^T_{cc} = [R|t][XYZ1]^T_{wc}$$

By substituting each coordinate (X, Y, Z) of the high-precision map to the coordinate transformation function and adjusting a rotation parameter R and a translation parameter t, the coordinate of each point in the high-precision map can be projected to the camera coordinate. In other words, by using the coordinate transformation function, the coordinate of the high-precision map with three-dimensional information can be transformed, such that the high-precision map can be projected on the display 40 (such as the screen of a mobile phone).

In an embodiment, the processor 30 can project the depth image by using the generally known positional tracking technology or through perspective projection.

In an embodiment, the depth image, as indicated in FIG. 3B, is a grayscale block. The closer to the camera 10, the brighter the object. For example, the grayscale block has a position corresponding to a real view image, such as the image a' of FIG. 3C. The farther away from the camera 10, the darker the object. For example, the grayscale block c has a position corresponding to a real view image, such as the building image c' of FIG. 3C. The grayscale block b has a position corresponding to the real view image, such as the building image b' of FIG. 3C, and is located between the grayscale blocks a and c. Besides, the depth image may include a prepared virtual image VI, such as the octopus VI of FIG. 3B. The depth image can be a three-dimensional image and may include a pre-defined virtual coordinate and a pre-defined virtual color.

In step 260, the depth image and the real view image are superimposed by the processor 30 to generate a stack image. For example, the processor 30 superimposes the depth image of FIG. 3B and the real view image of FIG. 3C to generate a stack image.

In an embodiment, the processor 30 compares an edge information of the grayscale block (such as an edge L of FIG. 3B) with an edge information of the real view image (such as an edge L' of FIG. 3C), and superimposes the depth image and the real view image by rotating or translating one of the grayscale block and the real view image (for example, the grayscale block is rotated or translated, such that the edge L is aligned with the edge L' of the real view image). In an embodiment, a comparison between the depth image and edge information of the real view image is made, and one of the depth image and the real view image is rotated or translated, such that the depth image and the real view image can be superimposed more accurately.

In an embodiment, each point in the stack image includes the depth information, which can be represented by coordinates or depth values.

In an embodiment, the stack image includes the coordinate information of each coordinate point in the real view image.

In step270, the virtual object is superimposed to the stack image by the processor 30 according to a virtual coordinate of the virtual object to produce a rendered image.

In an embodiment, the rendering process is defined as adding a virtual image or a virtual object to the real view image.

In an embodiment, since the stack image includes the coordinate information of each coordinate point in the real view image, the processor 30 superimposes the virtual object to the stack image according to the coordinate information and the virtual coordinate of the virtual object.

Figure 3D:
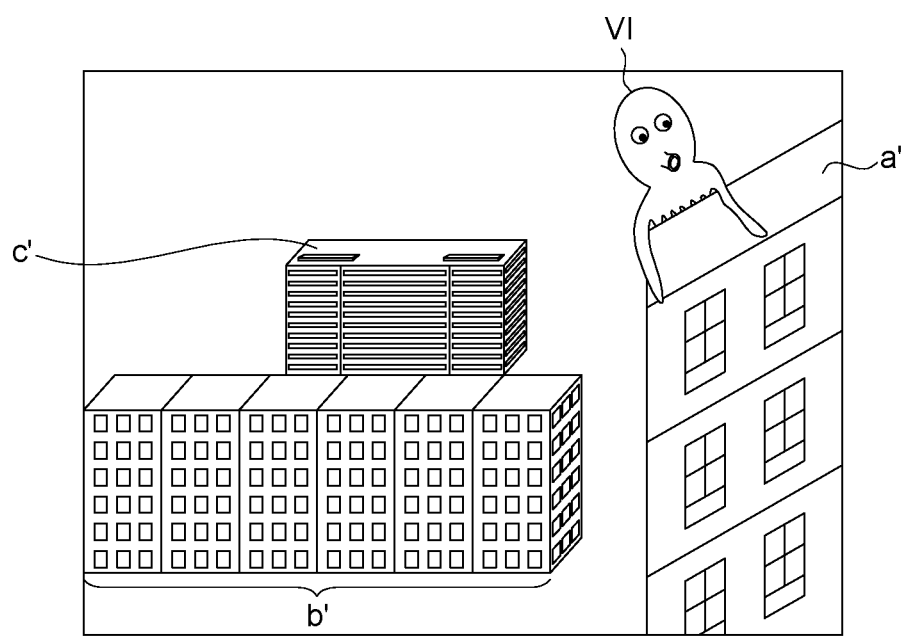

In an embodiment, the processor 30 superimposes the virtual object (such as the octopus VI of FIG. 3B) to a stack image according to the virtual coordinate of each coordinate point to produce a rendered image as indicated in FIG. 3D. Since the stack image includes the coordinate information of each coordinate point in the image and the virtual coordinate of each coordinate point of the virtual object (such as the octopus VI) are pre-defined, the octopus VI can be rendered to the stack image according to the virtual coordinate. In the present example, only two legs of the octopus VI are in front of the building a', and the other legs are behind the building a'. Therefore, only the two legs not blocked by the building a' can be seen in FIG. 3D. Thus, the position of each point of the octopus VI rendered to the stack image can be correctly calculated and mapped.

In step280, a rendered image is displayed by the display 40.

To summarize, according to the image processing system and the image processing method of the invention, a real view image is transformed and projected as a depth image according to the information such as the high-precision map and the camera posture. Then, the depth image and the real view image are precisely superimposed to generate a stack image, in which each point includes the depth information, such that the virtual object can be rendered to the stack image according to the corresponding virtual coordinate of the virtual object in the stack image. Thus, large object in the real view image and the virtual object can be precisely combined.

While the invention has been described by way of example and in terms of the preferred embodiment (s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An image processing system, comprising:
   a camera used for capturing a real view image of a large outdoor object;
   a positioning device used for detecting a camera position of the camera;
   a processor coupled to the camera and the positioning device, calculating a camera posture of the camera according to the camera position by using a simultaneous localization and mapping (SLAM) algorithm, projecting a depth image according to the camera posture and a three-dimensional information of a high-precision map, superimposing the depth image and the real view image to generate a stack image, and superimposing a virtual object to the stack image according to a virtual coordinate of the virtual object to produce a rendered image; and
   a display coupled to the processor for displaying the rendered image;
   wherein the three-dimensional information of the high-precision map comprises a three-dimensional composition of the real view image or a height information of the large outdoor object in the real view image.

2. The image processing system according to claim 1, wherein the depth image is a grayscale block, and the processor compares an edge information of the grayscale block with an edge information of the real view image and superimposes the depth image and the real view image by rotating or translating one of the grayscale block and the real view image.

3. The image processing system according to claim 1, wherein the stack image comprises coordinate information of each coordinate point in the real view image, and the processor superimposes the virtual object to the stack image according to the coordinate information and the virtual coordinate of the virtual object.

4. The image processing system according to claim 1, wherein the processor, by using a coordinate transformation function, maps coordinate of each coordinate point in the high-precision map to a camera coordinate for displaying on the display.

5. The image processing system according to claim 1, wherein the depth image is a grayscale block, and the processor compares an edge information of the grayscale block with an edge information of the real view image and superimposes the depth image and the real view image by translating one of the grayscale block and the real view image.

6. The image processing system according to claim 5, wherein the processor-further superimposes the depth image and the real view image by rotating one of the grayscale block and the real view image.

7. The image processing system according to claim 6, wherein the stack image comprises coordinate information of each coordinate point in the real view image, and the processor superimposes the virtual object to the stack image according to the coordinate information and the virtual coordinate of the virtual object.

8. The image processing system according to claim 6, wherein the processor, by using a coordinate transformation function, maps coordinate of each coordinate point in the high-precision map to a camera coordinate for displaying on the display.

9. An image processing method, comprising:
   capturing a real view image of a large outdoor object by a camera;
   detecting a camera position of the camera by a positioning device;
   calculating a camera posture of the camera according to the camera position by a processor using an SLAM algorithm;
   projecting a depth image by the processor according to the camera posture and a three-dimensional information of the high-precision map;
   superimposing the depth image and the real view image by the processor to generate a stack image;
   superimposing a virtual object to the stack image by the processor according to a virtual coordinate of the virtual object to produce a rendered image; and
   displaying the rendered image by a display;
   wherein the three-dimensional information of the high-precision map comprises a three-dimensional composition of the real view image or a height information of the large outdoor object in the real view image.

10. The image processing method according to claim 9, wherein the depth image is a grayscale block, and the image processing method further comprises:
   comparing an edge information of the grayscale block with an edge information of the real view image, and superimposing the depth image and the real view image by rotating or translating one of the grayscale block and the real view image.

11. The image processing method according to claim 9, wherein the stack image comprises coordinate information of each coordinate point in the real view image, and the image processing method further comprises:
   superimposing the virtual object to the stack image according to the coordinate information and the virtual coordinate of the virtual object.

12. The image processing method according to claim 9, further comprising:
   mapping coordinate of each coordinate point in the high-precision map to a camera coordinate for displaying on the display by using a coordinate transformation function.

13. The image processing method according to claim 9, wherein the depth image is a grayscale block, and the image processing method further comprises:
   comparing an edge information of the grayscale block with an edge information of the real view image, and superimposing the depth image and the real view image by translating one of the grayscale block and the real view image.

14. The image processing method according to claim 13, wherein the image processing method further comprises:
superimposing the depth image and the real view image by rotating one of the grayscale block and the real view image.

15. The image processing method according to claim 14, wherein the stack image comprises coordinate information of each coordinate point in the real view image, and the image processing method further comprises:
superimposing the virtual object to the stack image according to the coordinate information and the virtual coordinate of the virtual object.

16. The image processing method according to claim 14, further comprising:
mapping coordinate of each coordinate point in the high-precision map to a camera coordinate for displaying on the display by using a coordinate transformation function.

* * * * *

UNITED STATES PATENT AND TRADEMARK OFFICE
CERTIFICATE OF CORRECTION

| | | |
|---|---|---|
| PATENT NO. | : 11,012,616 B2 | Page 1 of 1 |
| APPLICATION NO. | : 16/298375 | |
| DATED | : May 18, 2021 | |
| INVENTOR(S) | : Shou-Te Wei and Wei-Chih Chen | |

It is certified that error appears in the above-identified patent and that said Letters Patent is hereby corrected as shown below:

On the Title Page

Please correct (71) second entry country to read:
Applicants: LITE-ON ELECTRONICS (GUANGZHOU) LIMITED, Guangzhou (CN); LITE-ON TECHNOLOGY CORPORATION, Taipei (TW)

Please correct first inventor in (72) to read:
Inventors: Shou-Te Wei, Taipei (TW); Wei-Chih Chen, Taipei (TW)

Signed and Sealed this
Seventeenth Day of August, 2021

Drew Hirshfeld
*Performing the Functions and Duties of the*
*Under Secretary of Commerce for Intellectual Property and*
*Director of the United States Patent and Trademark Office*